United States Patent [19]

Crandall et al.

[11] Patent Number: 5,206,047
[45] Date of Patent: Apr. 27, 1993

[54] PROCESS FOR MAKING HIGH BRIX CITRUS CONCENTRATE

[75] Inventors: Philip G. Crandall, Fayetteville, Ak.; Kathryn C. Davis, Lakeland, Fla.

[73] Assignee: University of Florida, Gainesville, Fla.

[21] Appl. No.: 710,784

[22] Filed: Jun. 5, 1991

[51] Int. Cl.$^5$ ............................................. A23L 2/06
[52] U.S. Cl. ................................. 426/599; 426/330.5
[58] Field of Search ............................. 426/599, 330.5

[56] References Cited

U.S. PATENT DOCUMENTS

| | | | |
|---|---|---|---|
| 4,374,865 | 2/1983 | Strobel | 426/599 |
| 4,499,112 | 2/1985 | Miller et al. | |
| 4,643,902 | 2/1987 | Lawhon | 426/599 |
| 4,818,555 | 4/1989 | Piotrowski et al. | |
| 4,886,574 | 12/1989 | Grant | 426/599 |
| 4,938,985 | 7/1990 | Swaine | 426/599 |
| 4,946,702 | 8/1990 | Stepp | 426/599 |
| 4,959,237 | 9/1990 | Walker | 426/599 |
| 4,971,811 | 11/1990 | Strobel | 426/599 |

OTHER PUBLICATIONS

Swientek, R., Homogenization of Orange Juice During Evaporation . . . Food Proc.; Jan. 1990.
Grant, P.; Homogenizing Concentrate in a Juice Evaporator; APV Gaulin, Inc.; Wilmington, Mass.; pp. 1-20.
Grandall, P. et al.; Viscosity Reduction by Homogenization of Orange Juice . . . J. Food Sci.; 53(5) 1477-1481; 1988.
Grandall, et al., Viscosity Reducation of Orange Juice Concentrate by Pulp . . . Food Technology; Apr. 1990; pp. 126-129.
Pepper, D.; Concentration of Fruit Juices Using Membranes; Paterson Candy Int'l. Ltd., Laverstoke Mill; pp. 137-141.
Milleville, H.; Direct Osmosis Concentrates Juices at Low Temperature; Food Processing; Jan. 1990; pp. 70-71.
Pederson, L.; High Temperature Hyperfiltration for Preconcentration of Juice; National Food Processors Assoc.; 1984; pp. 199-225.
Van Pelt, et al.; Freeze Concentration Economics and Potentials for the Citrus Industry; Institute of Food Technologists; 1984. pp. 169-198.
Barfod, N. M., et al.,; Determining the Setting Temperature of High-Methoxyl . . . Food Technology, Apr. 1990, 139-148.

Primary Examiner—Carolyn Paden
Attorney, Agent, or Firm—John R. Wetherell, Jr.

[57] ABSTRACT

Method which, after concentration of a feed juice from about 65° Brix to about 80° Brix, involves applying a shear of sufficient magnitude and duration to prevent the formation of a high methoxyl gel in the juice concentrate.

34 Claims, No Drawings

PROCESS FOR MAKING HIGH BRIX CITRUS CONCENTRATE

FIELD OF THE INVENTION

This invention relates to a method for preventing gelation of juice concentrate. This invention particularly relates to the prevention of high methoxyl gelation in high Brix citrus concentrate.

BACKGROUND

Soon after the introduction of Frozen Concentrated Orange Juice (FCOJ) in 1948, it was discovered that the FCOJ gelled when left at room temperature. Early FCOJ was concentrated above the desired Brix on low temperature evaporators and "cut back" juice was normally added to reduce the Brix to the desired level and to add flavor. "Brix" as used in citrus processing generally refers to the percent by weight of sugars in the citrus juice value obtained by a refractometer, corrected for temperature, to which is added a correction for citric acid.

Gelation is highly undesirable because it results in a high viscosity citrus concentrate product. A high viscosity product leads to problems in juice processing, evaporation, pumping, and storage of citrus concentrates. High viscosity reduces the heat transfer rates and flow of the falling concentrate film on the evaporation tubes and may cause the concentrate to "burn on" the hot surfaces, resulting in loss of product quality. In addition, a high viscosity concentrate product is more difficult to pump and can cause clogging is post-mix juice dispensers.

There are essentially two types of gels that can be formed with fruit juice pectins: low methoxyl (LM) and high methoxy (HM). The LM gel occurs when a pectin with a degree of esterification (DE) of less than 50% is combined with divalent ions to cross link the pectin structure. Orange juice has an abundance of divalent calcium ions (about 100 mg/Kg in 11.8° Brix juice) naturally present to do this cross linking. It is believed that the pectin chains are aligned so that parallel chains provide a cup or cavity of oxygen atoms for the $Ca^{++}$ ions. A series of calcium atoms can fit between the pectin chains forming an "egg box" shaped arrangement. This type of gel is mechanically and thermally reversible; it can be liquified by shearing (e.g., by mechanical blending) or by heating, but the gel reforms spontaneously after shearing is stopped or heating subsides. Commercially, this type of gel is used primarily in milk-type systems to produce such items as snacks puddings.

The second type of gel, HM, is also known as the sugar-acid type of gel. HM gels, in turn, can be divided into two broad types; rapid set (which sets in about 20 to 70 seconds and at a high temperature); and slow set (which sets in about 180 to 250 seconds and at a lower temperature). Commercially, HM type gels are used to make jams and jellies.

It is believed that the HM gel structure has junction zones of pectin molecules stabilized by both hydrogen bonding and hydrophobic forces. The hydrogen bonds are twice as strong as the hydrophobic forces, but require the addition of the hydrophobic forces in order to stabilize the gel. The hydrophobic forces are, in turn, stabilized by a high concentration of sugar at the proper pH. Unlike the LM gel, this type of gel does not require divalent ions for formation.

During the 1950's, the gelation problem became so severe that it threatened the infant citrus processing industry with extinction. Gelation of citrus concentrate was found to be caused by the naturally occurring enzyme, pectinesterase (PE). This enzyme was able to produce gelatin when pasteurization was delayed or the pasteurization temperature was insufficient to inactivate the native PE. PE was found to remove the methoxyl groups from the pectin and it was believed that this made the pectin more sensitive to cross linking by naturally occurring calcium ions in the juice. Together, the demethoxylated pectin and calcium, under the conditions in the concentrate, formed a low methoxyl (LM) type of gel. Later, it was discovered that when the citrus juice was rapidly heated to a high enough temperature, PE was inactivated before it could demethoxylate the pectin such that LM gelation did not occur. The replacement of the low temperature evaporators by Thermally Accelerated Short-Time Evaporators (TASTE) in the 1960's solved most citrus juice gelation problems by rapidly and completely inactivating PE.

Traditionally, 41.8° Brix orange concentrate is stored at temperature ranging from about $-11°$ C. to $0°$ C. It has been estimated that increasing the concentration and storing or transporting the orange concentrate at refrigerated temperatures of $3°$ C. to $6°$ C. could result in savings of about 15% in storage costs and about 30% in refrigeration costs. These savings are particularly important in light of the $1 \times 10^6$ tons of bulk orange concentrate that is shipped in the annual world market.

Unfortunately, to date is has not been practical to increase the concentration of orange concentrate much beyond about 62° Bris to 65° Bris because the resulting increased concentration of sugar causes extremely high viscosity and HM gelation. These high viscosities prevent the use of such high Brix concentrations with existing processing and storage equipment. Because it is economically advantageous to go to such higher Brix concentrations, there is a need to develop a method for preventing HM gel formation with its accompanying increase in viscosity. The present invention provides a method for achieving this objective.

SUMMARY OF THE INVENTION

The present invention relates to a method of applying a shear of sufficient force to a citrus juice concentrate from about 65° Brix to about 80° Brix that prevents the formation of high methoxyl gel in the juice concentrate. A preferred embodiment of the invention involves applying a shear of sufficient force to a citrus juice concentrate from about 65° Brix to about 72° Brix that prevents high methoxyl gel formation in the juice concentrate. The shearing that prevents the high methoxyl gel formation can be achieved by using any form of pumping or a form of manual or mechanical stirring which can induce the proper shear force.

The juice concentrate is obtained from feed juice that has been concentrated in an evaporator, which heats a flowing film of the feed juice with steam or vapor previously generated from the feed juice. The feed juice is not treated with pectic enzymes and thus has better cloud retention than pectic enzyme treated juice concentrate. "Cloud retention" refers to cloudiness or opaqueness of the juice and is an important visual quality of citrus juice.

Prior to the present invention, gel-free high °Brix juice concentrates could not be obtained without the use of additives, such as enzymes. The present invention thus provides the first demonstration that high °Brix concentrates can be produced using a shearing force to prevent gel formation, thereby avoiding the use of additives.

DETAILED DESCRIPTION OF THE INVENTION

The present invention relates to a method for the prevention of HM gelation in high Brix citrus concentrate without the addition of pectic enzymes. HM gelation causes an increase in the viscosity of high Brix citrus concentrate.

The method of the invention can utilize any type of fruit juice, especially fruit juice derived from plants of the genus Citrus. Preferred among plants of the genus Citrus is the orange. An important characteristic of the method of the invention is that it is especially useful with fruit juices that gel at concentrations higher than about 65° Brix, since it eliminates the utilization of additives, such as enzymes, in order to achieve such concentrations. This is especially significant in the case of feed juices derived from oranges since such enzymatic treatment is considered adulteration which limits the commercial value of juices treated in this manner.

Another key characteristic of the feed juices which can be used according to the present invention is the level of pulp which can be utilized. The term "pulp" generally refers to insoluble materials present in the juice which have a particle size of less than about $\frac{1}{8}$-$\frac{3}{4}$ in. Generally, as the level of pulp increases, the viscosity of the feed juice similarly increases. Typically, the more rigorously the feed juice is extracted and finished, the higher the level of pulp in the feed juice. Thus, in the prior art, it was necessary to use techniques to reduce pulp levels in the feed juice to about 10 to 12%. Pulp levels higher than these caused viscosity problems in the concentrated juice, and excess levels of pulp were a problem in some products. According to the present invention, it is possible to utilize pulp levels above those used in the prior art when pulp levels are not regulated in the finished product. According to the present invention, it is possible to utilize pulp levels from about 7% to about 21% by volume, allowing for more rigorous and efficient extraction and finishing of the feed juice prior to concentration.

The present invention can utilize a feed juice which has been concentrated by various techniques known to those of skill in the art. Such concentration techniques include reverse osmosis (Pepper, in *Proc. of 26th Annual Short Course for the Food Industry* 136, 1986), direct osmosis (Milleville, *Food Processing*, 51(1):70, 1990), ultrafiltration (Pederson, in *Proc. of 23rd Annual Short Course for the Food Industry*, 199, 1984), freeze concentration (van Pelt, et al., *Proc. of 23rd Annual Short Course for the Food Industry*, 169, 1984), evaporation, or combinations of these techniques. The present invention illustrates the use of evaporation to produce a juice concentrate.

Although the method of the present invention can be used with any of the known standard evaporator systems, the type of evaporator system most commonly used in the industry is the Temperature Accelerated Short-Time Evaporator (TASTE). TASTE evaporators concentrate by heating a flowing film of the feed juice with steam or vapor previously generated from the feed juice. In a standard 8-stage, 6-effect TASTE evaporator system, the feed juice is heated at progressively higher temperatures, starting at about 30° C., and passed through a maximum evaporative temperature above 96° C., followed by heating at progressively lower temperature ending at about 30° C. in order to obtain a concentrated juice solids level of 60°–65° Brix.

It is established from the literature that there is biological variation in citrus juice and citrus concentrates. One way this biological variation manifests itself is in the >30% variation in the viscosities of orange concentrates over a season. This is due, in part, to variation in the maturity, composition, and cultivars used. Therefore, it is necessary to establish "specific operating parameters" for each given situation, in order to produce a high Brix concentrate without gelation.

Typically, there is immediate blending of the concentrate after leaving the evaporator. These tanks are referred to as "blend tanks". In traditional concentrate production, this blending is used to reduce the variation in °Brix prior to storage. This is normally done by slow speed agitators in a large blend tank. These shear forces are typically not sufficient to prevent gel bond formation.

These "specific operating parameters" may be established using additional pumping and blending facilities which are temporarily added to the existing process system. The facilities are tested to insure that the pumping imparts sufficient shear force into the high °Brix concentrate to destroy the gel bonds which are in the process of formation. In the present invention, this was achieved by using a positive displacement pump which "recirculates" the concentrate within the blend tank. Additionally, high speed agitation was used to insure the contents of the tank were fully stirred. It is important that the pump and lines be operated full of concentrate to avoid incorporation of additional air during this process.

Typically, the blend tank is first filled with the concentrate of the desired °Brix. The tank agitator is operated during the filling of the tank. After the tank is filled, the recirculation pump is started to induce the necessary shear force. Duplicate samples of the recirculated concentrate can be taken every fifteen minutes for up to two hours, in small disposable containers (for example, 200 ml paper cups) in order to monitor the loss in the ability of the concentrate in gel. One sample will be placed in conditions similar to the storage environment, the other held at room temperature. Two hours after completing this test, the samples are removed from the container and their degree of gelation determined. The amount of time required to prevent permanent gel bonding is noted. This time may be shortened by increasing the amount of shear given the concentrate. This test may be repeated with other cultivars or concentrates with different °Brix.

After completing this test, permanent pump and piping arrangements can be installed. A safety margin of at least 30% needs to be incorporated in the design in order to accommodate changes in biological variation. Excess shear should be avoided because it may adversely affect the texture, mouth feel, taste, or other quality parameters.

For every evaporator there are two inputs, juice and steam, which are normally regulated to produce the desired output concentration (°Brix). By controlling the heating steam pressure and the rate of juice feed, the evaporator engineer is able to control the amount of work (evaporation) done. For example, a 60,000 pound of water removal per hour evaporator with a juice feed of 180 gallons per minute (gpm) and fifteen pounds per square inch (psi) of heating steam would give an output of about 62° Brix. The temperature of the product entering the first stage would be about 195° F.

To increase the output to approximately 72° Brix, the juice feed can be decreased to about 160 gpm and the heating steam pressure increased to about 17 psi. As a result, the product temperature rises about 200° F. Minor adjustments may have to be made to compensate for differences in each situation.

According to the present invention, it is possible to calculate the approximate amount of energy (shear) needed to prevent a high Brix concentrate from forming a gel. For example, if a tank containing 72° Brix concentrate with a viscosity of 250,000 mPa.s is assumed, then this concentrate can be sheared with a Tri-clover P-10 pump (described in the Example) at a flow rate of 15 liters per minute over a period of one hour. Gelation in the 72° Brix concentrate can be eliminated using a shear force of about 1.5 MJ ($10^6$ Joules) equivalent to 1.5 horse power being put into the concentrate.

Thus, according to the present invention, juice concentrates in the range of about 65° Brix to about 80° Brix can be prevented from gelling using a shear force from about 1.3 MJ to about 1.7 MJ. In the preferred juice concentrate range from about 65° Brix to about 72° Brix, the shear force needed would be about 1.3 MJ to about 1.5 MJ.

These values of shear may vary somewhat depending on the feed juice used to produce the concentrate, the size and speed of the pump, and size of pipes, as well as the operating temperature. However, these factors can be compensated for, without undue experimentation, and precise calculation of the necessary force can be determined by comparing the loss of gelation in small samples taken initially with those taken at various intervals during the shearing process.

Using these values and procedures, it is possible to calculate how much shear energy must be put into the concentrate by the pumping and piping system according to the particulars of the situation. Quality control methods are available to determine if excessive shear has been put into the concentrate (Redd, et al., *Quality Control Manual for Citrus Processing Plants*, 1983, Intercit, Inc., or other sources of quality control information).

The above disclosure generally describes the present invention. A more complete understanding can be obtained by reference to the following specific Examples which are provided for purposes of illustration only, and are not intended to be limiting unless otherwise specified.

EXAMPLE 1

One type of feed juice was processed in a commercial citrus processing plant using "Early-mid", mostly Hamlin cultivar oranges. The processing dates were two weeks apart and utilized FMC In-Line Extractors and finishers (FMC Citrus Machinery Division, Lakeland, Fla.) and a TASTE evaporator with eight stages capable of removing 32,000 Kg of water per hour. Commercial settings were used on the extraction equipment. The evaporator was washed, then stabilized at a 65° Brix output. Slowly the output concentration was increased to produce a gradation of samples from 65° Brix to 72° Brix. For the control samples, the homogenizer was run with the operating pressure off. For the homogenized samples, the homogenizer was run with the homogenizing pressure on at 20,000 KPa. Within each processing date, one set of control and homogenized samples was produced in the morning, then another set of samples was produced in the afternoon. Each day the tests lasted for ten to fourteen hours and consumed about 400,000 liters of juice.

Control and homogenized samples were held at about 20° C. for both the morning and afternoon runs. Measurements were taken on (1) effect of °Brix (66, 68, 70 and 72) on the formation of gel structure initially and one hour later; and (2) subjective evaluations of the gel. Two Brookfield viscometers, the HA and the LVT with spindles three or four at speeds of 30, 12 or 1.5 rpm (Brookfield Eng. Lab., Stoughton, Mass.), were used to take real time viscosity measurements on the effects of time on gel structural formation. These measurements were correlated with the subjective evaluations of the gels during their formation.

Another type of feed juice was processed at a second commercial citrus plant using Brown extractors and finishers (Brown International, Covina, Calif.). The TASTE evaporator at this plant is a 9-stage unit capable of removing 14,000 Kg of water per/hour. Processing was conducted three weeks apart in this plant using Valencia oranges. The procedure was similar to that above using Hamlin cultivar oranges. This evaporator was unable to produce control samples above 68° Brix because the high viscosity of the concentrate severely restricted the product flow in the latter stages of this evaporator, which had smaller tubes. Only one set of control and homogenized samples was collected for each day. The output port of the evaporator was modified to draw large samples greater than 20 liters in about ten seconds. Additional samples of the gradation °Brix were taken for gel evaluation using Ridgelimeter and Instron measurements. Samples of 72° Brix concentrate, 60 to 100 liters, were used in the gelation shearing experiments. Samples were collected to look at the effect of time and cooling on structural formation. Brookfield viscometer models LVT and HA were used to measure the viscosity of samples collected from the evaporator at 0 time (initial) and again at one, two and three hour intervals.

The following procedures provide evidence of HM gelation in orange concentrate above 68° Brix.

A. VISCOSITY INCREASES WITH FORMATION OF HIGH METHOXYL GEL

Table 1 shows a comparison of orange concentrate viscosities (Brookfield) initially after being pumped from the evaporator and after resting one hour at room temperature.

TABLE 1

| | RUN 1 | | | RUN 2 | | |
|---|---|---|---|---|---|---|
| TEST | Viscosity mPa·s (1,000) | Temp °C. | °Brix | Viscosity mPa·s (1,000) | Temp °C. | °Brix |
| CONTROL | | | | | | |
| Initial | 41 ± 12 | 20 | 68 | 27 ± 2 | 24 | 67 |
| after 1 hr | 20 ± 6 | 22 | | 57 ± 2 | 24 | |
| Initial | 61 ± 0.3 | 18 | 70 | 770 ± 110 | 24 | 69 |
| after 1 hr | 170 ± 55 | 21 | | 2,000 ± 15 | 24 | |
| Initial | 92 ± 19 | 20 | 72 | 860 ± 27 | 23 | 72 |

TABLE 1-continued

| | RUN 1 | | | RUN 2 | | |
|---|---|---|---|---|---|---|
| TEST | Viscosity mPa·s (1,000) | Temp °C. | °Brix | Viscosity mPa·s (1,000) | Temp °C. | °Brix |
| tial | | | | | | |
| after 1 hr | 750 ± 37 | 21 | | 1,400 ± 450 | 24 | |
| | HOMOGENIZED | | | | | |
| Initial | 120 ± 11 | 30 | 67 | 95 ± 23 | 21 | 68 |
| after 1 hr | 320 ± 102 | 26 | | 210 ± 30 | 22 | |
| Initial | 200 ± 0.6 | 21 | 71 | 160 ± 18 | 21 | 70 |
| after 1 hr | 1,500 ± 420 | 22 | | 320 ± 79 | 22 | |
| Initial | 240 ± 25 | 21 | 72 | 250 ± 19 | 19 | 73 |
| after 1 hr | 1,200 ± 116 | 23 | | 1,000 ± 110 | 22 | |

In Table 1, the viscosity significantly increased in all but one sample, the lowest °Brix control sample during Run 1. In the control samples, there was an 8-fold increase in viscosity between the Brookfield reading taken immediately after the sample was taken out of the evaporator compared to the same sample after sitting one hour. In the homogenized samples, there were significant increases in viscosity, the largest being almost eight times. Part of these samples looked "gel like" after one hour. This increase in structural formation is represented by the tremendous increase in viscosity. The results in Table 1 show that at elevated °Brix (68° Brix to 72° Brix uncorrected for acid), there is a substantially larger increase in viscosity upon standing than was reported by Ezell (*Food Technol.* 13(1):9, 1959), who used a lower °Brix to measure the amount of increase in structural formation after holding at room temperature.

B. EFFECT OF STORAGE TEMPERATURE AND TIME ON GEL FORMATION

HM gels were graded on a 0 to 5 scale depending on their strength. This is a modification of the Standard Gel Evaluation Test (Redd et al., *Quality Control Manual for Citrus Processing Plants*, 1986, Intercit, Inc. where:

0 = Concentrate of uniform appearance and contains no gel lumps
1 = Concentrate contains a few small gelled lumps but without tendency to "mound"
2 = Concentrate contains definite gelled lumps and resistance to pouring, slight tendency to "mound" but does not retain the shape of the container.
3 = Concentrate has a definite degree of gelation with a small portion maintaining the shape of the container
4 = Concentrate is over 75% gelled with retention of the shape of the container
5 = Concentrate is a 100% hard gel with the gel retaining the fine structure of the container Two storage temperatures and six time periods were used with four °Brix levels for both the control samples in Table 2 and the homogenized samples in Table 3.

TABLE 2

| CONTROL 20° C. - STORAGE TEMPERATURE - 0° C. | | | | |
|---|---|---|---|---|
| TIME | Gel[a] | °Brix | Gel | °Brix |
| INITIAL | 0 ± 0 | 71.6 ± 0.2 | 0 ± 0 | 71.5 ± 0.2 |
| 1 hour | 0.9 ± 0.9 | | 0 ± 0 | |
| 2 hours | 4.4 ± 0.7 | | 0 ± 0 | |
| 3 hours | 4.8 ± 0.2 | | 0 ± 0 | |
| 4 hours | 5.0 ± 0 | | 0 ± 0 | |
| 1 week | 5.0 ± 0 | | 4.5 ± 0.5 | |
| INITIAL | 0 ± 0 | 70.4 ± 0.2 | 0 ± 0 | 70.4 ± 0.4 |
| 1 hour | 0 ± 0 | | 0 ± 0 | |
| 2 hours | 0.8 ± 0.8 | | 0 ± 0 | |
| 3 hours | 4.3 ± 0.5 | | 0 ± 0 | |
| 4 hours | 4.9 ± 0.1 | | 0 ± 0 | |
| 1 week | 4.7 ± 0.4 | | 4.5 ± 0.9 | |
| INITIAL | 0 ± 0 | 68.6 ± 0.3 | 0 ± 0 | 68.7 ± 0.1 |
| 1 hour | 0 ± 0 | | 0 ± 0 | |
| 2 hours | 0 ± 0 | | 0 ± 0 | |
| 3 hours | 0 ± 0 | | 0 ± 0 | |
| 4 hours | 0 ± 0 | | 0 ± 0 | |
| 1 week | 3.8 ± 0.6 | | 0.3 ± 0.5 | |

[a]Gel ranked on a 0 to 5 scale with 0 being no gel and 5 very firm.

TABLE 3

| HOMOGENIZED 20° C. - STORAGE TEMPERATURE - 0° C. | | | | |
|---|---|---|---|---|
| TIME | Gel[a] | °Brix | Gel | °Brix |
| INITIAL | 0 ± 0 | 72.6 ± 0.3 | 0 ± 0 | 72.8 ± 0.6 |
| 1 hour | 4.9 ± 0.1 | | 0 ± 0 | |
| 2 hours | 4.8 ± 0.5 | | 0 ± 0 | |
| 3 hours | 5.0 ± 0 | | 4.4 ± 0.4 | |
| 4 hours | 5.0 ± 0 | | 4.9 ± 0.2 | |
| 1 week | 5.0 ± 0 | | 5.0 ± 0 | |
| INITIAL | 0 ± 0 | 70.2 ± 0.9 | 0 ± 0 | 70.4 ± 0.6 |
| 1 hour | 0 ± 0 | | 0 ± 0 | |
| 2 hours | — | | 0 ± 0 | |
| 3 hours | 5 ± 0 | | 0 ± 0 | |
| 4 hours | 4.9 ± 2 | | 3 ± 0 | |
| 1 week | 5 ± 0 | | 4.1 ± 0.5 | |
| INITIAL | 0 ± 0 | 68.3 ± 0.5 | 0 ± 0 | 67.8 ± 0.4 |
| 1 hour | 0 ± 0 | | 0 ± 0 | |
| 2 hours | 0 ± 0 | | 0 ± 0 | |
| 3 hours | 0 ± 0 | | 0 ± 0 | |
| 4 hours | 0 ± 0 | | 0 ± 0 | |
| 1 week | 2.2 ± 1.8 | | 0.5 ± 0.5 | |

[a]Gel ranked on a 0 to 5 scale with 0 being no gel and 5 very firm.

For the approximate 72° Brix samples stored at 202 C., there was significant HM gel formation after two hours. The gel formation continued and was complete by about four hours at 20° C. The approximate 72° Brix control samples at 0° C. progressed much slower and had no gel formation after four hours, but had significant gel formation after one week at 0° C.

For the approximate 70° Brix control samples stored at 20° C., it took 3 hours to form a 4+ gel (more than 75% of the gel retaining the shape of the container). Similarly, the approximate 70° Brix samples stored at a colder 0° C. showed no gel after four hours storage. After one week samples of the approximate 70° Brix orange concentrate stored at either 20° C. or 20° C. were about equal in gel strength.

Samples of approximately 68° Brix formed little HM gel at 20° C. until after one week of storage. There was very little gel in the approximate 68° Brix stored one week at 0° C. On all the samples less than 67° Brix, there was no evidence of gel after storage at 20° C. or 0° C. after one week. Overall, the gel reaction proceeds slower at 0° C. than 20° C. This could be due to the lower temperature and increased viscosity reducing the rate of hydrogen and hydrophobic bond formation necessary for the HM gel formation (Oakenfull and Scott, *J. Food Sci.* 49(4):1093, 1984; *Food Technol.* in Australia, 37(4):156, 1985). The higher the °Brix, the higher is the concentration of solids and the lower is the water activity. Thus, the HM gel forms more rapidly and to a greater extent.

C. VISCOSITY CHANGES AMONG °BRIX, STORAGE TEMPERATURE AND TIME

A comparison among the various °Brix levels, temperatures and time is shown in Table 4 for control samples.

TABLE 4

| | CONTROL | | | |
|---|---|---|---|---|
| TIME | 66.3°Brix | Temp | 68.0°Brix | Temp |
| | ROOM TEMPERATURE | | | |
| INITIAL | $270^a \pm 5$ | 17.9 | $320 \pm 4$ | 19.0 |
| 1 hour | $270 \pm 6$ | 19.6 | $300 \pm 4$ | 20.5 |
| 2 hours | $271 \pm 4$ | 20.5 | $331 \pm 13$ | 20.9 |
| 3 hours | $100^b \pm 10$ | 21.1 | $100^b \pm 7$ | 21.5 |
| 4 hours | $60^b \pm 3$ | 21.6 | $92^b \pm 7$ | 21.9 |
| | 0° C. | | | |
| INITIAL | $130 \pm 3$ | 17.9 | $150 \pm 2$ | 18.9 |
| 1 hour | $200 \pm 4$ | 10.4 | $240 \pm 13$ | 13.3 |
| 2 hours | $270 \pm 3$ | 5.2 | $377 \pm 10$ | 3.6 |
| 3 hours | $290 \pm 3$ | 2.6 | $390^b \pm 1$ | 2.2 |
| 4 hours | $280 \pm 16$ | 4.3 | $400 \pm 3$ | 3.7 |

[a]Values in centipoise × 100
[b]Speed or spindle had to be changed because spring was fully extended dial >100.

The control samples stored at 0° C. seemed to increase in viscosity less rapidly than the room temperature stored sample when their 15° C. drop in temperature is considered. After about two hours, the room temperature samples passes through a transition period where the 68° Brix samples went to a No. 3 gel. The 0° C. stored samples were the first samples run initially which allowed time for the room temperature stored samples to begin to form some initial structure.

A homogenizer run with an evaporator was used to make 72° Brix homogenized orange concentrate as shown in Table 5.

TABLE 5

| | HOMOGENIZED | | | |
|---|---|---|---|---|
| | ROOM TEMPERATURE | | | |
| TIME | 66°Brix | Temp | 68°Brix | Temp |
| INITIAL | $70 \pm 4^a$ | 22.7 | $240 \pm 9$ | 19.8 |
| 1 hour | $87 \pm 1$ | 23.1 | $290 \pm 6$ | 21.8 |
| 2 hours | $47^b \pm 7$ | 22.8 | $360 \pm 13$ | 22.2 |
| 3 hours | $50 \pm 5$ | 22.9 | $700^b \pm 11$ | 22.4 |
| 4 hours | $44 \pm 1$ | 22.8 | $2900^b \pm 7$ | 22.6 |
| TIME | 70°Brix | Temp | 72°Brix | Temp |
| INITIAL | $270 \pm 6$ | 19.6 | $1600 \pm 85$ | 19.6 |
| 1 hour | $290 \pm 19$ | 20.9 | $1300 \pm 290$ | 20.6 |
| 2 hours | $2400^b \pm 113$ | 21.3 | $1800 \pm 236$ | 21.7 |
| 3 hours | $2900 \pm 170$ | 22.1 | $3990 \pm 28$ | 22.3 |
| 4 hours | $2000 \pm 198$ | 22.4 | $9400^b \pm 177$ | 22.6 |
| | 0° C. | | | |
| Time | 66°Brix | Temp | 68°Brix | Temp |
| INITIAL | $72 \pm 2$ | 22.5 | $180 \pm 4$ | 19.2 |
| 1 hour | $240^b \pm 3$ | 8.0 | $270 \pm 3$ | 5.0 |
| 2 hours | $210 \pm 7$ | 4.5 | $642 \pm 0$ | 4.4 |
| 3 hours | $210 \pm 2$ | 4.5 | $340^b \pm 11$ | 2.6 |
| 4 hours | $210 \pm 1$ | 4.8 | $360 \pm 19$ | 3.0 |
| TIME | 70°Brix | Temp | 72°Brix | Temp |
| INITIAL | $170 \pm 3$ | 18.6 | $210 \pm 1$ | 18.9 |
| 1 hour | $380 \pm 10$ | 9.5 | $1200^b \pm 28$ | 3.8 |
| 2 hours | $520^b \pm 7$ | 3.5 | $1300 \pm 54$ | 3.5 |
| 3 hours | $380 \pm 1$ | 4.1 | $1300 \pm 69$ | 3.5 |
| 4 hours | $710 \pm 3$ | 2.5 | $1300 \pm 0$ | 4.0 |

[a]Values in centipoise × 100
[b]Speed or spindle had to be changed because spring was fully extended dial >100.

In the homogenized samples of Table 5, there was a marked increase in viscosity related to the increase in °Brix. This transition occurred in the 72° Brix samples after one hour, in the 70° Brix after two hours, and after three hours in the 68° Brix. This is the point at which these samples formed gels. For the samples stored at room temperature, the 70° Brix and 72° Brix samples progressed to a No. 4 to 5 gel by four hours storage. For the homogenized samples stored at 0° C., the higher °Brix samples increased more rapidly in viscosity. Only the 72° Brix sample started to get after four hours when it had reached 3°–4° C.

D. GEL EVALUATION USING RIDGELIMETER MEASUREMENTS

Samples of orange concentrates were taken in specially designed Lexan containers which had been sprayed with cooking oil to permit the removal of the gel without rupturing. These jelly glasses had 2 cm of tape above the top rim. Samples were held eighteen hours at 20° C. before using the Standard Jelly Evaluation (FT Committee on Pectin Standardization, Food Tech. 13:496, 1959). Ridgelimeter values for progressively higher °Brix orange concentrate gels are shown in Table 6.

TABLE 6

| | RUN 1 | | | RUN 2 | |
|---|---|---|---|---|---|
| °Brix | Ridgelimeter Reading | Correction Factor | °Brix | Ridgelimeter Reading | Correction Factor |
| 66.0 | $35.0a^a$ | 0.67 | 66.1 | 25.1a | 0.93 |
| 68.1 | $16.9b$ | $1.29^b$ | 67.8 | 17.9b | 1.25 |
| 70.7 | 11.8c | | 69.9 | 14.8c | |
| 72.9 | 9.9d | | 72.0 | 12.9d | |

[a]All values are the means of duplicates, values not followed by the same letter (in the same column) are significantly different p > 0.05. Gels measured by the Ridgelimeter according to (IFT, 1956).
[b]Correction factor for assumed jelly grade times correction factor equals the true grade (IFT, 1959).

The Ridgelimeter values in Table 6 show there was a significant increase in the internal HM gel strength for every approximate 2° increase in °Brix.

E. GEL COMPRESSION TESTS

In Table 7, the measurement of resistance on a 57 mm plunger is shown after a five second compression by the plunger to displace the HM gel surface of various orange concentrate Brix by 1.25 mm.

TABLE 7

| °Brix | Control or Homogenized | Grams of Resistance |
|---|---|---|
| 66 | Control | $69.7a^a$ |
| 68 | Control | 110.b |
| 66 | Homogenized | 165.c |
| 68 | Homogenized | 223.cd |
| 70 | Homogenized | 334.de |
| 72 | Homogenized | 503.e |

[a]Values are the means of duplicate measurements. Values not followed by the same letter are significantly different p > 0.05.

In Table 7, both the 66° Brix control samples had significantly less gel strength then the corresponding °Brix homogenized samples. The 70° Brix and 72° Brix homogenized samples had a significantly stronger gel than the lower °Brix samples. The 72° Brix sample was almost twice as strong as the 68° Brix sample.

F. GEL EVALUATION USING INSTRON MEASUREMENTS

The Instron was used for texture analysis of the orange concentrate samples. Samples were placed in an 87×14 mm plastic petri dish (Scientific Products D-1906) with 2 cm tape above the tape rim. After 48 hours storage at 25° C., the tape was removed and a flat uniform surface cut with a cheese slicer. This HM gel was subjected to very small compressions (1.25 mm) using a flat probe, a 57 mm diameter compression anvil, on the Instron (Instron Model, 1011; four sq. in. compression anvil T 13-235). The probe was moved down at a cross head speed of 0.25 mm per second. This was found to give a linear plot of load versus penetration for at least fifteen seconds. The 5 Kg load cell was used in the 2 or 5 Kg range (a modification of the procedures of Oakenfull, et al., *Gums and Stabilizers for the Food Industry*, 1987, Phillips, G. O. Ch. 4., IRL Press, Ltd).

Another set of orange concentrate samples was placed in 250 ml sample cups (Corning No. 25410) which had been sprayed with cooking oil and had tape 2 cm above the top rim. After 48 hours stored at 25° C., the tape was removed and a flat uniform surface cut with a cheese slicer. These samples were carefully slid into a fifty sq. cm Instron cell (Model 2830-017 Ottawa Texture Measuring System with a perforated plate). This formed a tight fit between the sides of the sample and the sides of the cell holding the sample upright. Then the plunger was pressed into the sample at a cross head speed of 200 mm/min. The sample was displaced out the bottom of the cell. The force/time plot and breaking strength were recorded. All of the samples on the Instron were measured in duplicate.

Peak load of orange concentrate gels measured by destructive texture analysis on the Inston are shown in Table 8.

TABLE 8

| | RUN 1 | | | RUN 2 | |
|---|---|---|---|---|---|
| °Brix | Control or Homogenized | Peak Force in Kg | °Brix | Control or Homogenized | Peak Force in Kg |
| 66 | Control | 0.46a[a] | 66 | Homogenized | 0.40a |
| 66 | Homogenized | 0.54b | 66 | Control | 0.56ab |
| 68 | Homogenized | 1.07c | 68 | Control | 0.69b |
| 68 | Control | 1.08c | 68 | Homogenized | 1.03c |
| 70 | Homogenized | 2.24d | 70 | Homogenized | 1.75d |
| 72 | Homogenized | 3.7e | 72 | Homogenized | 2.69e |

[a]Values are the means of duplicate measurements. Values no followed by the same letter in the same column are significantly different at $p > 0.05$.

For Runs 1 and 2 in Table 8, the 72° and 70° Brix samples had significantly firmer gels. The homogenized 72° Brix gel required almost seven times more force to rupture its internal strength than the corresponding 66° Brix gel. This is a tremendous increase in gel strength just from increasing the concentration 6° Brix. In Run 1, the homogenized and control 68° Brix gel were not significantly different in gel strength.

EXAMPLE 2

The following procedure shows that the structure of HM gel can be destroyed through shearing.

GEL EVALUATION AFTER SHEARING EFFECT USING INSTRON MEASUREMENTS

Samples of 72° Brix orange juice concentrate were taken from Valencia concentrate which had been subjected to shear. A lobe type pump (Tri-Clover, P-10) was set at 16 liters/min and connected in a recirculation mode to a 200 liter tank. About 100 liters of concentrate were added to the tank and recirculated by the pump. Control samples were taken prior to starting the recirculating pump. The sample was also stirred by hand to ensure complete mixing. Samples were taken initially and each ¼ hour for two hours. Samples were placed in taped and oiled gel evaluation cups.

After one hour of high speed shearing, the HM gel was completely broken down. The 72° Brix concentrate looked very similar to the 66° Brix concentrate. These samples were examined after three months storage at −10° C. The control still had a very firm gel shape. The 72° Brix concentrate that was sheared for ¼ hour still had a gel-like consistency, while the same concentrate sheared for one hour was smooth and contained no gel or lumps.

Table 9 shows the results from textural evaluation of the HM gel using an Instron set up. Destructive Instron measurements show peak loading on orange juice concentrate. Samples were subject to a progressively longer time of post concentration shear.

TABLE 9

| | RUN 1 | | RUN 2 | |
|---|---|---|---|---|
| Time Hr. | Peak Force in Kg | Subjective Grade | Peak Force in Kg | Subjective Grade |
| 0 | 2.87a | 5.0 | 2.46a | 5.0 |
| 0.5 | 1.78b | 4.3 | 1.56b | 4.0 |
| 1 | 1.03c | 0 | 0.37c | 0.0 |
| 1.5 | 0.68d | 0 | — | — |
| 2.0 | 0.53e | 0 | — | — |

Values are the means of duplicate determinations. Numbers in columns not followed by the same letter are significantly different at the $p > 0.05$.

For the results in Table 9, the gels were carefully slid into the bottom ½ of the 50 cm² Instron cell described above and made a tight fit. The plunger was moved down at a uniform cross head speed and the resistance of the gel measured on a chart recorder. The results in Table 9 show a significant drop in peak force needed after one hour of shearing. This is especially evident in Run No. 2. These results provide support for going to higher °Brix concentrate with corresponding savings in storage and transportation costs.

The invention now being fully described, it will be apparent to one of ordinary skill in the art that various changes and modification can be made without departing from the spirit or scope of the invention.

We claim:

1. A method for producing a concentrate essentially free of high methoxyl gel, which comprises the steps of:
   (a) providing a feed juice;
   (b) concentrating the feed juice to a concentration of from about 65° Brix to about 80° Brix; and
   (c) subjecting the concentrated juice to a shear of sufficient force to prevent formation of high methoxyl gel in the concentrated juice.

2. The method of claim 1, wherein the shear force is from about 1.3 MJ to about 1.7 MJ.

3. The method of claim 1, wherein the shear force is from about 1.3 MJ to about 1.5 MJ.

4. The method of claim 1, wherein the feed juice is concentrated by reverse osmosis, ultrafiltration, evaporation, or combinations of these techniques.

5. The method of claim 4, wherein the use of evaporation the evaporator heats a flow film of the feed juice with steam or vapor previously generated from the feed juice.

6. The method of claim 4, wherein in the use of evaporation the evaporator is a thermally accelerated short-time evaporator.

7. The method of claim 1, wherein the juice concentrate has a concentration of from about 65° Brix to about 72° Brix.

8. The method of claim 1, wherein the feed juice has a pulp level of from about 7% to about 21% by volume.

9. The method of claim 1, wherein the shear force is induced by pumping.

10. The method of claim 9, wherein the pumping is induced using a lobe or positive displacement type pump.

11. The method of claim 1, wherein the shear force is induced by means of manual or mechanical stirring.

12. The method of claim 1, wherein the juice concentrate is derived from fruit produced by plants of the genus Citrus.

13. The method of claim 12, wherein the juice concentrate is derived from the orange.

14. The method of claim 13, wherein the orange is of the Valencia variety.

15. A juice concentrate essentially free of high methoxyl gel having a concentration of from about 65° Brix to about 80° Brix containing no additive.

16. The concentrate of claim 15, wherein the juice concentrate has a concentration of from about 65° Brix to about 72° Brix.

17. The concentrate of claim 15, wherein the juice concentrate is derived from a feed juice having a pulp level of from about 7% to about 21% by volume.

18. The concentrate of claim 15 which is derived from fruit produced by plants of the genus Citrus.

19. The concentrate of claim 18 wherein the juice concentrate is derived from the orange.

20. The concentrate of claim 19 wherein the orange is of the Valencia variety.

21. The concentrate of claim 20 wherein the feed juice is concentrated by reverse osmosis, ultrafiltration, evaporation, or combinations of these techniques.

22. The concentrate of claim 21 wherein in the use of evaporation the evaporator heats a flow of film of the feed juice with steam or vapor previously generated from the feed juice.

23. The concentrate of claim 21 wherein in the use of evaporation the evaporator is a thermally accelerated short-time evaporator.

24. A juice concentrate essentially free of high methoxyl gel having a concentration of from about 65° Brix and 80° Bris, containing no additive, obtained by:
(a) providing a feed juice;
(b) concentrating the feed juice to a concentration of from about 65° Brix to about 80° Brix; and
(c) subjecting the concentrated juice to a shear of sufficient force to prevent formation of high methoxyl gel in the juice concentrate.

25. The concentrate of claim 24 wherein the shear force is from about 1.3 MJ to about 1.7 MJ.

26. The concentrate of claim 24 wherein the shear force is from about 1.3 MJ to about 1.5 MJ.

27. The concentrate of claim 24, wherein the juice concentrate has a concentration of from about 65° Brix to about 72° Brix.

28. The concentrate of claim 24, wherein the feed juice has a pulp level of from about 7% to about 21% by volume.

29. The concentrate of claim 24, wherein the shear force is induced by pumping.

30. The concentrate of claim 29, wherein the pumping is induced using a lobe or positive displacement type pump.

31. The concentrate of claim 30, wherein the shear force is induced by means of manual or mechanical stirring.

32. The concentrate of claim 24, wherein the juice concentrate is derived from fruit produced by plants of the genus Citrus.

33. The concentrate of claim 32, wherein the juice concentrate is derived from the orange.

34. The concentrate of claim 33, wherein the orange is of the Valencia variety.

* * * * *